United States Patent
Cabiac et al.

(10) Patent No.: US 11,091,702 B2
(45) Date of Patent: Aug. 17, 2021

(54) HYDROPROCESSING OF HYDROCARBON FEEDS WITH A CATALYST COMPRISING AN ALUMINIUM MATERIAL COMPRISING CARBON

(71) Applicant: IFP Energies Nouvelles, Rueil-Malmaison (FR)

(72) Inventors: Amandine Cabiac, Givors (FR); Alexandra Chaumonnot, Lyons (FR); Etienne Girel, Villeurbanne (FR); Audrey Bonduelle-Skrzypczak, Francheville (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/769,736

(22) PCT Filed: Nov. 26, 2018

(86) PCT No.: PCT/EP2018/082519
§ 371 (c)(1),
(2) Date: Jun. 4, 2020

(87) PCT Pub. No.: WO2019/110346
PCT Pub. Date: Jun. 13, 2019

(65) Prior Publication Data
US 2021/0171839 A1    Jun. 10, 2021

(30) Foreign Application Priority Data
Dec. 5, 2017    (FR) ..................... 1761616

(51) Int. Cl.
| | |
|---|---|
| *C10G 45/04* | (2006.01) |
| *B01J 37/02* | (2006.01) |
| *C10G 45/50* | (2006.01) |
| *C10G 45/54* | (2006.01) |
| *B01J 27/188* | (2006.01) |
| *B01J 37/20* | (2006.01) |
| *B01J 37/08* | (2006.01) |
| *B01J 23/883* | (2006.01) |

(52) U.S. Cl.
CPC ............ *C10G 45/04* (2013.01); *B01J 23/883* (2013.01); *B01J 27/188* (2013.01); *B01J 37/0213* (2013.01); *B01J 37/084* (2013.01); *B01J 37/20* (2013.01); *C10G 45/50* (2013.01); *C10G 45/54* (2013.01); *C10G 2300/70* (2013.01)

(58) Field of Classification Search
CPC ........ C10G 45/04; C10G 45/50; C10G 45/54; C10G 2300/70; B01J 23/883; B01J 27/188; B01J 37/084; B01J 37/0213; B01J 37/20
See application file for complete search history.

(56) References Cited

U.S. PATENT DOCUMENTS

| | | |
|---|---|---|
| 2004/0226863 A1 | 11/2004 | Uzio et al. |
| 2008/0146438 A1 | 6/2008 | Bai et al. |
| 2012/0318717 A1 | 12/2012 | Inoue et al. |

OTHER PUBLICATIONS

Haber, J. et al. (1995) Pure and Applied Chemistry, 67, 1257-1306.*
International Search Report dated Jan. 2, 2019 issued in corresponding PCT/EP2018/082519 application (3 pages).

* cited by examiner

*Primary Examiner* — Brian A McCaig
(74) *Attorney, Agent, or Firm* — Millen, White, Zelano and Branigan, P.C.

(57) ABSTRACT

The invention relates to a method for hydroprocessing a hydrocarbon feed, operated at a temperature of between 180° C. and 450° C., in the presence of a catalyst comprising i) a composite material comprising a compound based on at least one crystalline aluminium solid and carbon, the deposited carbon content being between 1 and 25 wt. % of the total mass of the composite material, and ii) at least one element of group VIB and at least one element of group VIII, in the sulfide form thereof, said catalyst being produced by a method comprising at least: a) a step of bringing a carbon precursor into contact with a compound based on at least one crystalline aluminium solid, b) a step of thermally treating the solid produced by step a), c) repeating steps a) and b) until the desired deposited carbon content is reached, d) depositing at least one element of group VIB and at least one element of group VIII on the surface of the solid produced by step c), and e) a step of sulfidisation of the solid produced in step d).

15 Claims, No Drawings

HYDROPROCESSING OF HYDROCARBON FEEDS WITH A CATALYST COMPRISING AN ALUMINIUM MATERIAL COMPRISING CARBON

TECHNICAL FIELD

The present invention pertains to the field of processes for hydrotreating hydrocarbon feedstocks which are operated in the presence of a catalyst comprising composite materials comprising a compound based on at least one crystalline aluminous solid and carbon.

PRIOR ART

The aim of a catalyst for hydrotreating hydrocarbon fractions is commonly that of removing the sulfur compounds or nitrogen compounds contained in said fractions or of hydrogenating the aromatic molecules, in order, for example, to bring a petroleum product into line with the required specifications (sulfur content, aromatics content, etc.) for a given application (automobile fuel, gasoline or gas oil, domestic fuel oil, jet fuel). The aim may also be to pretreat this feedstock so as to remove its impurities or to hydrogenate it before subjecting it to various transformation processes for the purpose of modifying its physicochemical properties, such as, for example, processes of reforming, vacuum distillate hydrocracking, catalytic cracking, or atmospheric or vacuum residue hydroconversion. A particularly good description of the composition and the use of hydrotreating catalysts is found in Catalysis By Transition Metal Sulfides, From Molecular Theory To Industrial Application by H. Toulhoat and P. Raybaud, Technip (2013).

The tightening of automobile pollution standards within the European Community (Official Journal of the European Union, L76, Mar. 22, 2003, Directive 2003/70/EC, pages L76/10-L76/19) has compelled refiners to reduce very greatly the sulfur content of diesel fuels and gasolines (to a maximum of 10 parts per million weight (ppm) of sulfur on Jan. 1, 2009, as against 50 ppm on Jan. 1, 2005). Moreover, refiners are finding themselves compelled to use feedstocks which are increasingly resistant to the hydrotreating processes, firstly because the crudes are heavier and heavier and consequently contain more and more impurities, and secondly because of the increase in conversion processes in the refineries. The reason is that these processes give rise to fractions which are more difficult to hydrotreat than the fractions obtained directly from atmospheric distillation. The term "more difficult to hydrotreat" refers, for example, to the higher operating temperatures for attaining the same sulfur content of the effluent, or higher hydrogen pressures for attaining hydrogenation of higher aromatics, and consequently cycle times which may be reduced.

These resistant feedstocks require catalysts possessing hydrodesulfurizing and hydrogenating functions which are greatly improved relative to the traditional catalysts. Moreover, the conversion processes such as catalytic cracking or hydrocracking use catalysts which possess an acidic function, so making them particularly sensitive to the presence of nitrogen impurities, and especially of basic nitrogen compounds. It is therefore necessary to use catalysts for pretreating these feedstocks so as to remove these compounds.

Conventional hydrotreating catalysts generally comprise a support based on one or more oxides, and an active phase based on metals from groups VIB and VIII. The preparation of these catalysts generally comprises a step of impregnating the metals on the support, followed by drying and optionally calcining, enabling the elements to be obtained in their oxide forms. Before being used in a hydrotreating and/or hydrocracking reaction, these catalysts are generally subjected to sulfurization in order to form the active phase.

The addition of an organic compound to the hydrotreating catalysts to improve their activity is often recommended, especially for catalysts prepared by impregnation followed by drying without subsequent calcining. These catalysts are often referred to as "additized dried catalysts". Many documents describe the use of various ranges of organic compounds as additives, such as nitrogen-containing organic compounds and/or oxygen-containing organic compounds. A class of compounds that is now well known from the literature relates to chelating organic nitrogen-based compounds (EP 0 181 035, EP 1 043 069 and U.S. Pat. No. 6,540,908) with, by way of example, ethylenediaminetetraacetic acid (EDTA), ethylenediamine, diethylenetriamine or nitrilotriacetic acid (NTA). In the class of oxygen-based organic compounds, the use of monools, diols or polyols which are optionally etherified is described in WO 96/41848, WO 01/76741, U.S. Pat. Nos. 4,012,340, 3,954, 673, EP 601 722 and WO 2005/035691. Several patents are also found that claim the use of carboxylic acids (EP 1 402 948, EP 0 482 817). The prior art mentions less frequently additives including ester functions (EP 1 046 424, WO 2006/077326). US 2013/267409 describes the use of an organic compound of formula R1COCH2COR2 in which R1 and R2 are identical or different and are selected from a group consisting of a C1 to C12 alkyl, a C6 to C12 allyl, a C1 to C12 alkoxy, and a hydroxyl. Irrespective of the organic compounds selected, the modifications induced do not always make it possible to sufficiently increase the performance of the catalyst in order to meet the specifications concerning the sulfur and/or nitrogen contents of fuels. Furthermore, it is often very complicated to proceed to the industrial deployment of these additized catalysts as the preparation techniques are complex to implement (high number of preparation steps, organic molecules for impregnation are insoluble in the aqueous solutions conventionally used, etc.). Consequently it appears to be essential, for catalyst manufacturers, to find new hydrotreating and/or hydrocracking catalysts with improved performance.

One of the problems in the preparation of hydrotreating catalysts lies in particular in the problems of sulfurization, dispersion or promotion of the sulfide phase, especially due to interactions between supports and precursors of the sulfide phase. To overcome this problem, the strategy pursued by the applicant has been that of modifying these interactions by selective deposition of carbon on the surface of the oxide-based support, so leading to a gain in performance of the associated hydrotreating and/or hydrocracking catalyst.

There are a number of techniques in the literature for producing a deposit of carbon on the surface of an oxidic solid. It is possible in particular to produce such a deposit by ambient-temperature adsorption of carbon precursors of "sugar" type in solution on the surface of silicas, mesostructured silicas, aluminas, etc., and pyrolysis of these sugars (high-temperature calcining in a low-oxygen environment) so as to generate a carbon layer (WO 2013/169391). The C/oxide composite which results is characterized by a deposited carbon content of 10 to 25 weight % relative to the weight of the catalyst and by a surface reactivity associated with the partial transformation of the starting sugars into a fine, partially functionalized carbon layer (pyrolysis temperature of less than 600° C.), thereby ensuring a specific catalytic behavior relative to the unprotected starting oxide, especially for catalytic reactions of the "biomass to chemicals" type, which are usually carried out at temperature and at pressure in aqueous environments and which employ catalysts based on noble metals. A second possible option is to carry out deposition of carbon by vapor-phase decomposition (CVD=chemical vapor deposition) of a carbon precursor (methane, ethylene, benzene) in a high temperature range (600 to 900° C.) (Vissers et al., *J. Catal.*, 1988, 114, 2, 291; Xiong et al., *Angew. Chem. Int. Ed.*, 2015, 54, 27, 7939). A third possible option, more recent, is to adsorb a carbon precursor of sugar or polyol type on the surface of a crystalline aluminous solid under what are called "hydrothermal" (HT) operating conditions, to pyrolyze said precursor, and to repeat as many "adsorption/pyrolysis" cycles as needed until the desired carbon content has been deposited (cf. patent application FR 17/57,841). The $C/Al_2O_3$ composite thus obtained is characterized by a relatively low carbon content (1 to 15 weight % relative to the total mass of the final solid) and by a specific localization of the carbon on the surface of the aluminous support, this being manifested in the inhibition of reactive surface sites due to the rehydration of the aluminous support under specific conditions—for example, HT conditions. The content of carbon deposited by weight is different according to the synthesis methodologies proposed, so implying that it is these methodologies which have an impact on the nature and the intrinsic properties of the carbon deposit produced and on the potential interactions between oxide-based support and carbon/precursors of the sulfide phase, where the catalyst synthesized is a hydrotreating and/or hydrocracking catalyst.

Another possible strategy, intended to cover the surface OH groups of aluminous solids, involves not synthesizing composite $C/Al_2O_3$ solids but instead utilizing the adsorption capacity of the aluminous surface for specific organic molecules, such as polyols, for example (Ravenelle et al., *Top Catal.*, 2012, 55, 3, 162). This method, however, has a number of major drawbacks, such as the impossibility of protecting the aluminous support before the deposition of the metallic active phase, the need to carry out and control this "in situ" protection when the catalyst is in use (or during the pretreatment of said catalyst), and the difficulty of regenerating said catalyst in the event that it is used in cyclic processes.

The applicant has found, surprisingly, that a composite material comprising a compound based on at least one crystalline aluminous solid and carbon allows the catalysts prepared from this support to increase significantly the hydrotreating (hydrodesulfurization, hydrogenation, and hydrodenitrogenation) reactions by comparison with the hydrotreating catalysts conventionally used.

SUBJECT AND ADVANTAGE OF THE INVENTION

The invention concerns a process for hydrotreating a hydrocarbon feedstock, which is operated at a temperature of between 180° C. and 450° C. and at a pressure of between 0.5 MPa and 30 MPa, in the presence of a catalyst comprising i) a composite material comprising at least one compound based on at least one crystalline aluminous solid and carbon, the deposited carbon content being between 1 and 25 weight % of the total mass of the composite material, and ii) at least one element from group VIB and at least one element from group VIII, in their sulfide form, said catalyst being prepared by a process comprising at least:

a) a step of contacting a mixture comprising at least one carbon precursor with at least one compound based on at least one crystalline aluminous solid, at a temperature of between 50 and 300° C. and at a pressure corresponding at least to the autogenous pressure, the concentration of carbon precursor in said mixture being between 2 and 100 g/l, and the mass ratio of carbon precursor relative to the compound based on at least one aluminous solid in the suspension consisting of said mixture being between 0.1 and 2;

b) a step of heat-treating the solid obtained at the end of step a);

c) the repetition of steps a) and b) until the desired deposited carbon content is obtained;

d) the deposition of at least one element from group VIB and at least one element from group VIII on the surface of the composite material obtained at the end of step c);

e) a step of sulfurization of the solid obtained in step d).

The hydrotreating process according to the invention, employing this type of catalyst, exhibits catalytic performances which are increased relative to the processes of the prior art which employ catalysts not comprising the specific material according to the invention. More particularly, the process according to the invention exhibits increased activity relative to the processes of the prior art.

The process of hydrotreating a hydrocarbon feedstock according to the invention is used in particular in hydrodesulfurization, hydrodenitrogenation, hydrodemetalation, hydrogenation, and hydrogenation of aromatics (or hydrodearomatization) of said hydrocarbon feedstock. In particular it provides access to greater hydrogenation of the aromatics in the feedstock than the hydrogenation obtained with conventional methods which employ, for example, catalysts based on alumina without carbon.

It is applied to any hydrocarbon feedstock commonly treated in hydrotreating processes, such as, for example, gasolines, gas oils, vacuum gas oils, atmospheric residues, vacuum residues, atmospheric distillates, vacuum distillates, heavy fuel oils, oils, waxes and paraffins, used oils, deasphalted residues or crudes, feedstocks originating from thermal or catalytic conversion processes, taken alone or as mixtures. The feedstocks that are treated, and in particular those mentioned above, generally contain heteroatoms such as sulfur, oxygen and nitrogen and, for heavy feedstocks, they usually also contain metals.

Characterization Techniques

The composite material as described in the present invention is described in particular by means of the following characterization techniques: nitrogen adsorption/desorption volumetry and "CHNS" elemental analysis.

Nitrogen adsorption/desorption volumetry, corresponding to the physical adsorption of molecules of nitrogen in the porosity of the material via a progressive increase in pressure (P/P0, where P0=atmospheric pressure) at constant temperature, provides information on the textural characteristics (pore diameter, pore volume, specific surface area) particular to the composite material according to the invention.

Specific surface area refers to the BET specific surface area. ($SBFT$ in $m^2/g$) determined by nitrogen adsorption in accordance with standard ASTM D 3663-78 developed from the Brunauer-Emmett-Teller method described in "*The Journal of the American Society*", 1938, 60, 309.

The pore distribution representative of a population of mesopores centered in a range of 2 to 50 nm is determined by the Barrett-Joyner-Halenda (BJH) model. The adsorption—desorption isotherm of nitrogen according to the BJH model that is obtained in this way is described in "*The Journal of the American Society*", 1951, 73, 373, by E. P. Barrett, L. G. Joyner and P. P. Halenda. In the text below, the diameter of the mesopores $\phi$ in the composite material according to the invention corresponds to the maximum diameter obtained on the pore distribution curve for desorption. Similarly, the pore volume (Vp) corresponds to the volume obtained at the maximum value of P/P0. Furthermore, the appearance of the nitrogen adsorption isotherm and of the hysteresis loop may provide information regarding the nature of the mesoporosity.

CHNS elemental analysis allows the rapid determination of the carbon (C), hydrogen (H), nitrogen (N), and sulfur (S) contents of organic matter and other types of material, on the basis of the total combustion of the analytical sampling at 1000° C. in a stream of oxygen and under pressure. The carbon, hydrogen, nitrogen and sulfur in the samples are converted respectively into carbon dioxide, water, nitrogen dioxide, and sulfur dioxide. These products are separated on a chromatographic column and quantified on a thermal conductivity detector, a katharometer.

DETAILED DESCRIPTION OF THE INVENTION

By "crystalline aluminous solid", is meant, according to the invention, any aluminous compound forming part of the family of transition aluminas and also alpha-alumina (or corundum) and derivatives thereof which result from the dehydration of aluminous precursor materials of aluminum trihydroxide (gibbsite, bayerite, norstandite, doyleite) or aluminum oxy(hydroxide) (boehmite, diaspore) type, in other words forming part of the following nonexhaustive list: gamma, delta, theta, eta, rho, chi, kappa aluminas. By solids derived from transition aluminas and alpha-alumina are meant any transition alumina or alpha-alumina comprising one or more additional elements, an example being beta-alumina, which is stabilized by alkali metal ions.

By "compound based on at least one crystalline aluminous solid" is meant any compound whose crystalline aluminous solid content is at least such that it is detected by X-ray diffraction (XRD) analysis, in other words such that said content represents at least 10 weight %, preferably at least 20 weight %, and more preferably at least 50 weight %, relative to the total mass of said compound. Examples include aluminosilicate materials which conform to this description. The compound based on at least one crystalline aluminous solid may contain up to 100 weight % of crystalline aluminous solid.

The process according to the invention is a process for hydrotreating a hydrocarbon feedstock which is operated at a temperature of between 180° C. and 450° C. and at a pressure of between 0.5 MPa and 30 MPa, in the presence of a catalyst comprising i) a composite material comprising at least one compound based on at least one crystalline aluminous solid and carbon, the deposited carbon content being between 1 and 25 weight % of the total mass of the composite material, and ii) at least one element from group VIB and at least one element from group VIII, in their sulfide form, said catalyst being prepared by a process comprising at least:
a) a step of contacting a mixture comprising at least one carbon precursor with at least one compound based on at least one crystalline aluminous solid, at a temperature of between 50 and 300° C. and at a pressure corresponding at least to the autogenous pressure, the concentration of carbon precursor in said mixture being between 2 and 100 g/l, and the mass ratio of carbon precursor relative to the compound based on at least one crystalline aluminous solid in the suspension consisting of said mixture being between 0.1 and 2;
b) a step of heat-treating the solid obtained at the end of step a);
c) the repetition of steps a) and b) until the desired deposited carbon content is obtained;
d) the deposition of at least one element from group VIB and at least one element from group VIII on the surface of the composite material obtained at the end of step c);
e) a step of sulfurization of the solid obtained in step d).

The process according to the invention preferably employs a catalyst prepared by a process consisting of steps a) to e) above.

The process according to the invention is applied advantageously to reactions for hydrotreating hydrocarbon feedstocks, and more particularly to hydrogenation, hydrodenitrogenation, hydrodearomatization, hydrodesulfurization, hydrodemetalation or hydroconversion reactions of hydrocarbon feedstocks. It may also be applied in the pretreatment of catalytic cracking feedstocks or in the hydrodesulfurization of residues or the forced hydrodesulfurization of gas oils (ULSD: ultra-low-sulfur diesel).

The hydrocarbon feedstocks treated by the hydrotreating process according to the invention are notably selected from petroleum fractions, fractions from coal liquefaction, or hydrocarbons produced from natural gas. These are, for example, gasolines, gas oils, vacuum gas oils, atmospheric residues, vacuum residues, atmospheric distillates, vacuum distillates, heavy fuel oils, oils, waxes and paraffins, used oils, deasphalted residues or crudes, feedstocks originating from thermal or catalytic conversion processes, taken alone or as mixtures. The feedstocks that are treated, and in particular those mentioned above, generally contain heteroatoms such as sulfur, oxygen and nitrogen and, for heavy feedstocks, they usually also contain metals.

The hydrotreating process according to the invention is advantageously operated at a temperature of between 180 and 450° C., preferably between 250 and 440° C., at a pressure of between 0.5 and 30 MPa, preferably between 1 and 20 MPa, and more preferably between 1 and 18 MPa, at an hourly space velocity (HSV) of between 0.1 and 20 h$^{-1}$ and preferably between 0.2 and 5 h$^{-1}$, and with a hydrogen/feedstock ratio, expressed as volume of hydrogen, measured under standard conditions of temperature and pressure, per volume of liquid feedstock, of between 50 l/l and 2000 l/l.

The catalyst used in the process according to the invention advantageously has a deposited carbon content of between 1 and 25 weight % relative to the total mass of the catalyst, preferably between 1 and 15 weight %, and more preferably between 3 and 15 weight % relative to the total mass of the catalyst.

According to the invention, the composite material comprises at least one compound based on at least one crystalline aluminous solid and carbon. Said composite material preferably consists of at least one compound based on at least one crystalline aluminous solid and carbon. The deposited carbon content is between 1 and 25 weight % relative to the total mass of said composite material, preferably between 1 and 15 weight %, and more preferably between 3 and 15 weight % relative to the total mass of the catalyst.

The catalyst used in the process according to the invention comprises at least one element from group VIB and at least one element from group VIII according to the IUPAC classification. The elements from group VIB are preferably selected from Mo and W, alone or in a mixture. The elements from group VIII are preferably selected from Co, Ni, and Fe, alone or in a mixture.

A catalyst in the sense of the present invention refers to a solid comprising a composite material comprising a compound based on at least one crystalline aluminous solid and carbon, and also comprising at least one element from group VIB and at least one element from group VIII in their active form for hydrotreating reactions, in other words in their sulfide form.

Said active phase is a sulfided form of the elements from group VIB and from group VIII, resulting from the contacting of said elements from group VIB and from group VIII with $H_2S$ or any other compound able to generate $H_2S$ by decomposition.

According to the invention, the "unactivated catalyst" is the solid comprising the material comprising a compound based on at least one crystalline aluminous solid and carbon, and also comprising at least one element from group VIB and at least one element from group VIII, in their nonsulfided form.

The total amount of elements from groups VIB and VIII of the periodic table according to the IUPAC classification is preferably and advantageously between 0.1 and 35 weight % and with preference between 0.1 and 25 weight % relative to the total weight of said catalyst. The element from group VIB is advantageously between 0.1 and 25 weight % relative to the total weight of said catalyst, and the element from group VIII is advantageously between 0.1 and 10 weight % relative to the total weight of said catalyst. The molar ratio of group VIII element to group VIB element is advantageously between 0.1 and 0.8, and preferably between 0.15 and 0.6.

Contacting Step a)

The catalyst used in the process according to the invention is prepared by a process comprising a step a) of contacting a mixture comprising at least one carbon precursor with at least one compound based on at least one crystalline aluminous solid at a temperature of between 50 and 300° C. and at a pressure corresponding at least to the autogenous pressure.

Said step a) is carried out under hydrothermal conditions. This means that the contacting is carried out in an autoclave, with the whole of the reaction mixture then being brought to a temperature of between 50 and 300° C., preferably between 100 and 250° C., and more preferably between 140 and 210° C., the pressure corresponding at minimum to the autogenous pressure associated with the temperature selected. The contacting may be carried out under an oxidizing atmosphere (air), a neutral atmosphere (inert gas: dinitrogen, argon, etc.) or a reductive atmosphere, i.e., composed entirely or partly of dihydrogen. The atmosphere is preferably air.

Said carbon precursor is an organic molecule, advantageously of sugar (glucose, fructose, sucrose, etc.) or polyol type. When said carbon precursor is a polyol, said polyol contains preferably at least 3 carbon atoms and more preferably at least 5 carbon atoms and also has preferably at least three vicinal hydroxyl groups (aside from terminal hydroxyl groups) and more preferably has vicinal hydroxyl groups in threo configuration. Polyols which can be used may be selected for example from the following list: xylitol, sorbitol, dulcitol. The carbon precursor is preferably an organic molecule of polyol type.

The mixture comprising the carbon precursor is advantageously aqueous. It may be neutral, acidic or basic. It is preferably neutral. The pH of the mixture may be adjusted by adding compounds which allow regulation of pH, so as to give an acidic, basic or neutral mixture. These compounds may belong to the following nonexhaustive list: nitric acid, hydrochloric acid, sulfuric acid, carboxylic acids, ammonia, tetraethylammonium hydroxide, urea.

The concentration of carbon precursor in the mixture is between 2 and 100 g/l, preferably between 5 and 50 g/l, and more preferably between 5 and 35 g/l.

The contacting of a mixture comprising at least one carbon precursor with at least one compound based on at least one crystalline aluminous solid results in a suspension being obtained. The composition of the suspension is such that the mass ratio of carbon precursor relative to the compound based on at least one aluminous solid in the suspension is between 0.1 and 2, preferably between 0.3 and 1, and more preferably between 0.3 and 0.6.

Said suspension is advantageously autoclaved with stirring in any autoclave which allows a specific temperature to be imposed at a pressure at minimum equal to the autogenous pressure with stirring, at a temperature of between 50 and 300° C., preferably between 100 and 250° C., and more preferably between 140 and 210° C.

Heat Treatment Step b)

The catalyst used in the process according to the invention is prepared by a process comprising a step b) of heat-treating the solid obtained at the end of step a).

Step b) of heat-treating the solid obtained at the end of step a) consists advantageously of a first step of drying at a temperature of between 50 and 150° C., in an oven, for example, then a second step of pyrolysis, carried out in a tube furnace in a flow-through bed under a stream of inert gas (dinitrogen, argon, etc.) with a flow rate of between 1 and 30 ml/min/g and preferably between 5 and 15 ml/min/$g_{solid}$ and at a temperature of between 300 and 1000° C., advantageously between 400 and 700° C., for a time of 0.5 to 24 hours, preferably for a time of 0.5 to 12 hours, and more preferably for a time of 0.5 to 5 h.

Step c) of Repetition of Steps a) and b)

The catalyst used in the process according to the invention is prepared by a process comprising a step c) of repeating steps a) and b) until the desired deposited carbon content is obtained, namely until a deposited carbon content is obtained of between 1 and 25 weight % relative to the total mass of the composite material, preferably between 1 and 15 weight %, and more preferably between 3 and 15 weight %.

Step c) is advantageously carried out at least once, preferably at least twice, and more preferably at least 5 times.

Step d) of Depositing at Least One Element from Group VIB and at Least One Element from Group VIII The catalyst used in the process according to the invention is prepared by a process advantageously comprising a step d) of depositing at least one element from group VIB and at least one element from group VIII of the periodic table according to the IUPAC classification on the composite material obtained at the end of step c).

The deposition of at least one element from group VIB and at least one element from group VIII as per step d) may advantageously be carried out by any technique known to those skilled in the art, such as, for example, by ion exchange, dry impregnation, excess impregnation, vapor-phase deposition, etc. Deposition may proceed in one step or in a plurality of successive steps.

According to one preferred embodiment of the invention, said step or steps of deposition is (are) carried out by the so-called "dry" impregnation method, which is well known to those skilled in the art.

The deposition of at least one element from group VIB and at least one element from group VIII advantageously involves a precursor of said metals.

The precursors of group VIII elements that may be used are well known to those skilled in the art. The precursors of the non-noble metal or metals from group VIII are advantageously selected from oxides, hydroxides, hydroxycarbonates, carbonates, and nitrates. Nickel hydroxycarbonate, nickel nitrate, cobalt nitrate, nickel carbonate or nickel hydroxide, cobalt carbonate or cobalt hydroxide are used with preference.

The precursors of group VIB elements that may be used are well known to those skilled in the art. For example, among the sources of molybdenum, use may be made of oxides and hydroxides, organometallic complexes, molybdic acids and salts thereof, in particular the ammonium salts such as ammonium molybdate, ammonium heptamolybdate, phosphomolybdic acid ($H_3PMo_{12}O_{40}$) and salts thereof, and optionally silicomolybdic acid ($H_4SiMo_{12}O_{40}$) and salts thereof. The sources of molybdenum may also be any polyoxometallate of Keggin, lacunary Keggin, substituted Keggin, Dawson, Anderson or Strandberg type, for example. Preference is given to using molybdenum trioxide and heteropolyanions of Strandberg ($P_2Mo_5O_{23}^{6-}$), Keggin ($PMo_{12}O_{40}^{3-}$), lacunary Keggin or substituted Keggin type, which are known to those skilled in the art.

For example, among the precursors of tungsten, use may be made of oxides and hydroxides, tungstic acids and salts thereof, in particular the ammonium salts such as ammonium tungstate, ammonium metatungstate, phosphotungstic acid ($H_3PW_{12}O_{40}$) and salts thereof, and optionally silicotungstic acid ($H_4SiW_{12}O_{40}$) and salts thereof. The sources of tungsten may also be any polyoxometallate of Keggin, lacunary Keggin, substituted Keggin or Dawson type, for example. Preference is given to using oxides and ammonium salts such as ammonium metatungstate or heteropolyanions of Keggin, lacunary Keggin or substituted Keggin type, which are known to those skilled in the art.

The solutions used in the various steps of impregnation or successive impregnation may optionally contain at least one precursor of a doping element selected from boron, phosphorus, and silicon, and/or at least one organic compound.

The precursors of said doping element and/or the organic compound may also advantageously be added to impregnating solutions not containing the precursors of at least one element from group VIB and of at least one element from group VIII, taken alone or as a mixture.

Said organic compound, when added, is advantageously deposited by impregnation, before the impregnation of the metal precursors, in co-impregnation with the metal precursors, or in post-impregnation after impregnation of the metal precursors.

Said organic compound may be selected from chelating agents, nonchelating agents, and reducing agents. It may also be selected from optionally etherified monools, diols or polyols, carboxylic acids, sugars, noncyclic mono-, di- or polysaccharides such as glucose, fructose, maltose, lactose or sucrose, esters, ethers, crown ethers, cyclodextrins, and compounds containing sulfur or nitrogen such as nitriloacetic acid, ethylenediaminetetraacetic acid or diethylenetriamine, alone or as a mixture.

Preferably, said precursors of the metals from group VIII and of the metals from group VIB, the precursors of the doping elements, and the organic compounds are advantageously introduced into the impregnating solution or solutions in an amount corresponding:

- to a total content of elements from groups VIB and VIII of the periodic table according to the IUPAC classification of between 0.1 and 35 weight %, preferably between 0.1 and 25 weight %, relative to the total weight of said catalyst,
- to a molar ratio of element(s) from group VIII to element(s) from group VIB of between 0.1 and 0.8, and preferably between 0.15 and 0.6,
- to a molar ratio of doping element(s) (for example, B, Si, P) to element(s) from group VIB of between 0 and 1, and preferably between 0.08 and 0.7,
- to a molar ratio of organic compound(s) to element(s) from group VIB of between 0 and 5, and preferably between 0.2 and 3.

The impregnation or successive impregnations is (are) advantageously followed by a maturation step. This maturation allows the precursors to diffuse within the porosity of the support. It is advantageously carried out at atmospheric pressure and at a temperature of between 17° C. and 50° C. A maturation time of between ten minutes and forty-eight hours and preferably of between thirty minutes and five hours is generally sufficient. Longer times are not excluded.

A drying step at a temperature less than or equal to 120° C. may also be carried out following the maturation step. This drying enables elimination of some or all of the solvent used during the impregnation. It is advantageously performed by any technique known to those skilled in the art. The drying step is advantageously performed at atmospheric pressure under air or under inert gas (dinitrogen or argon) or at reduced pressure. This step is preferably carried out at reduced pressure. It is advantageously performed at a temperature of between 50 and less than 120° C., preferably of between 60 and 120° C., and very preferably of between 80 and 120° C. The time of this drying step is preferably between 30 minutes and 4 hours and more preferably between 1 hour and 3 hours.

In one preferred embodiment of the invention, step d) of depositing at least one element from group VIB and at least one element from group VIII consists of an impregnation step, followed by a maturation step carried out at atmospheric pressure, at a temperature of between 17° C. and 50° C., for a time of between 10 minutes and 48 hours, then by a step of drying at a temperature less than or equal to 120° C.

Sulfurization Step e)

The catalyst used in the process according to the invention is prepared by a process comprising a step of sulfurizing the solid obtained at the end of step d).

This sulfurizing step may advantageously be carried out ex situ or in situ, in other words respectively outside or inside the hydrotreating reactor.

In one preferred embodiment, the solid obtained at the end of step d) is sulfurized ex situ by means of an $H_2S/H_2$ or $H_2S/N_2$ gas mixture containing at least 5 volume % of $H_2S$, at a temperature greater than or equal to the ambient temperature, under a total pressure greater than or equal to 1 bar for at least 2 h. The sulfurization temperature is preferably greater than or equal to 250° C. Very preferably, the sulfurization temperature is greater than or equal to 350° C.

In another preferred embodiment, the sulfurizing step may also be carried out in situ, before the implementation of the process according to the invention, by any sulfurizing process well known to those skilled in the art. The sulfurizing step is in particular carried out by means of the feedstock to be treated in the presence of hydrogen ($H_2$) and hydrogen sulfide ($H_2S$), which are introduced as they are or by way of at least one organic sulfur compound which, by decomposing, forms hydrogen sulfide ($H_2S$). The organic sulfur compound may be selected from dimethyl disulfide (DMDS), dimethyl sulfide, n-butyl mercaptan, and polysulfide compounds. This sulfurization is carried out at a temperature of between 200 and 600° C. and preferably between 300 and 400° C., at a pressure of between 1 and 18 MPa, for at least 2 hours.

The composite material according to the invention, or the catalyst, or the unactivated catalyst, comprising said composite material, may be in the form of a powder, beads, pellets, granules or extrudates, with the shaping operations being carried out by the conventional techniques known to those skilled in the art.

The examples that follow demonstrate the substantial gain in activity over the catalysts prepared by the process according to the invention relative to the catalysts of the prior art, and particularize the invention without, however, limiting its scope.

EXAMPLES

Example 1 (Conformant)

Synthesis of a Material Conformant to the Invention, Comprising 7 Weight % of Carbon 1 g of sorbitol ($C_6H_{14}O_6$) and 15 g of gamma-alumina (mass ratio of sorbitol to $Al_2O_3$=0.5) are mixed with 100 ml of distilled water in an autoclave equipped with a mechanical blade stirrer. The system is closed hermetically and then brought to 200° C. with a ramp of 8° C./min, with mechanical stirring at 300 rpm. The temperature is maintained for 10 h and then the solid is recovered by centrifuging the solution at 13 000 rpm. After washing with distilled water, the solid is dried in an oven at 100° C. for 10 h and then pyrolyzed at 600° C. for 1 h in a tube furnace in a flow-through bed under a stream of nitrogen of 10 ml/min/g with a temperature ramp of 5° C./min. The sample is then recovered and the whole of the procedure is repeated identically 7 consecutive times. During the preparations, the concentration of sorbitol in the sorbitol/water mixture remains the same (10 g/l), the mass ratio of sorbitol relative to the composite is maintained at 0.5, and the volume of distilled water is maintained at 100 ml for each repetition.

The final sample is characterized by nitrogen adsorption/desorption volumetry. The data are set out in table 1. The corresponding sample is called $C/Al_2O_3$ ads.

It is compared with gamma-alumina calcined at 600° C. for 2 h in air. The corresponding sample is called $Al_2O_3$ calcined 600° C.

TABLE 1 textural properties and mass content of the reference alumina and of the carbon-on-alumina sample prepared according to example 1.

| Sample | C content (weight %) | $S_{BET}$ ($m^2/g$) | Dp (nm) | Vp (ml/g) |
|---|---|---|---|---|
| $Al_2O_3$ calcined 600° C. | 0 | 212 | 7.3 | 0.35 |
| $C/Al_2O_3$ ads | 7 | 198 | 6.5 | 0.32 |

Example 2

Preparation of Unactivated Catalysts C1 and C2

The unactivated catalysts C1 (conformant) and C2 (non-conformant) are prepared by impregnation, respectively, of 10 g of supports "$C/Al_2O_3$ ads" and "$Al_2O_3$ calcined 600° C." with an aqueous solution in which the following precursors have been dissolved under reflux: $Ni(OH)_2$ and $MoO_3$ with $H_3PO_4$. The volumes of solution prepared are 4.1 ml and 3.8 ml respectively. The concentrations of elements are adjusted so that the mass content of Mo metal is 17 weight % relative to the weight of the unactivated catalyst. The Ni and P contents are such that the molar ratios are approximately: Ni/Mo=0.4 and P/Mo=0.55. After impregnation, the solids undergo a maturation step at ambient temperature in air for 12 h, before being dried under vacuum for 4 h at 100° C.

Example 3

Toluene Hydrogenation Testing of Catalysts C1 and C2

The aim of the toluene hydrogenation test is to evaluate the hydrogenating activity of the solid or supported sulfurized catalysts, in the presence of $H_2S$ and under hydrogen pressure.

The catalysts C1 and C2 are tested in the same test unit and under the same operating conditions.

The test proceeds in the gas phase, in a reactor with a fixed bed of flow-through type. The test subdivides into two distinct phases: sulfurization and catalytic testing. The operating conditions of the activation phase and of the test are as follows: Ptot=60 bar, T=350° C. and $H_2$/feedstock=450 l/l. The feedstock flow rates are equal to HSV=4 l/l/h during the activation phase (sulfurization in situ), and HSV=2 l/l/h during the testing phase. The test feedstock is composed of dimethyl disulfide (DMDS), toluene, and cyclohexane. The same feedstock is used in the sulfurization.

Sulfurization

The sulfurization or activation phase is carried out in situ, inside the catalytic reactor. The unactivated catalysts undergo a rise in temperature from the ambient temperature to 350° C., in the presence of the above-described feedstock, with a temperature ramp of 2° C./min, in a tube reactor with a fixed bed of flow-through type in a pilot unit of the Flowrence type (constructor: Avantium), with the fluids circulating from top to bottom. When the temperature has reached 350° C., the activation phase is maintained for 2 hours before the testing phase is commenced.

Catalytic Testing:

The stabilized catalytic activities are measured for equal volumes of catalysts (450 µl) and at a temperature of 350° C. The measurements of hydrogenating activity are performed 2 hours after 350° C. have been attained.

The sampled effluents are analyzed by gas chromatography. The catalytic performance of the catalysts is expressed by means of the hydrogenating activity, which corresponds, following a first-order kinetic law, to:

$$AH_{order.1} = \ln\frac{100}{(100 - \% \ HYD_{toluene})}$$

% HYDtoluene corresponds to the percentage of toluene hydrogenated.

The catalytic performance is collated in table 2. It is expressed as relative activity, taking the activity of the catalyst C2 as being 100.

TABLE 2

| relative hydrogenating activities of catalysts C1 and C2. | |
| --- | --- |
| Catalyst | Hydrogenating activity relative to C2 |
| C1 (conformant) | 119 |
| C2 (nonconformant) | 100 |

Table 2 shows a substantial gain in the hydrogenating power that is obtained with the conformant catalyst C1 relative to the nonconformant catalyst C2. The catalyst C1 according to the invention is more active in hydrogenation than the catalyst C2, which is its formulation counterpart but is prepared by a traditional route on alumina without carbon.

The invention claimed is:

1. A process for hydroprocessing a hydrocarbon feedstock, which is operated at a temperature of between 180° C. and 450° C. and at a pressure of between 0.5 MPa and 30 MPa, in the presence of a catalyst comprising i) a composite material comprising a compound based on at least one crystalline aluminous solid and carbon, the deposited carbon content being between 1 and 25 weight % of the total mass of the composite material, and ii) at least one element from group VIB and at least one element from group VIII, in their sulfide form,
   said catalyst being prepared by a process comprising at least:
   a) a step of contacting a mixture comprising at least one carbon precursor with a compound based on at least one crystalline aluminous solid, at a temperature of between 50 and 300° C. and at a pressure corresponding at least to the autogenous pressure, a concentration of carbon precursor in said mixture being between 2 and 100 g/l, and a mass ratio of carbon precursor relative to the compound based on at least one aluminous solid in the suspension consisting of said mixture being between 0.1 and 2;
   b) a step of heat-treating the solid obtained at the end of step a);
   c) the repetition of steps a) and b) until the desired deposited carbon content is obtained;
   d) the deposition of at least one element from group VIB and at least one element from group VIII on the surface of the solid obtained at the end of step c);
   e) a step of sulfurization of the solid obtained in step d).

2. The process for hydroprocessing as claimed in claim 1, being a process of hydrogenation, hydrodenitrogenation, hydrodearomatization, hydrodesulfurization, hydrodemetalation or hydroconversion of hydrocarbon feedstocks.

3. The process for hydroprocessing as claimed in claim 1, wherein the hydrocarbon feedstock is selected from petroleum fractions, fractions from coal liquefaction or hydrocarbons produced from natural gas.

4. The process for hydroprocessing as claimed in claim 1, being operated at a temperature of between 250 and 440° C.

5. The process for hydroprocessing as claimed in claim 1, being operated at a pressure of between 1 and 18 MPa.

6. The process for hydroprocessing as claimed in claim 1, wherein the content of carbon deposited on the compound based on at least one crystalline aluminous solid is between 1 and 15 weight % of the total mass of the composite material.

7. The process for catalyst preparation as claimed in claim 1, wherein the concentration of carbon precursor in the mixture is between 5 and 35 g/l.

8. The process for catalyst preparation as claimed in claim 1, wherein the mass ratio of carbon precursor relative to the compound based on at least one aluminous solid in the suspension is between 0.3 and 0.6.

9. The process for catalyst preparation as claimed in claim 1, wherein said step a) is operated at a temperature of between 140 and 210° C.

10. The process for catalyst preparation as claimed in claim 1, wherein said step b) consists of a first step of drying at a temperature of between 50 and 150° C., then of a second step of pyrolysis carried out in a tube furnace in a flow-through bed under a stream of inert gas with a flow rate of between 1 and 30 ml/min/$g_{solid}$ and at a temperature of between 300 and 1000° C., for a time of 0.5 to 24 hours.

11. The process for catalyst preparation as claimed in claim 1, wherein the total content of elements from groups VIB and VIII of the periodic table according to the IUPAC classification is between 0.1 and 35 weight % relative to the total weight of said catalyst.

12. The process for catalyst preparation as claimed in claim 1, wherein a content of element from group VIB is between 0.1 and 25 weight % relative to the total weight of said catalyst.

13. The process for catalyst preparation as claimed in claim 1, wherein a molar ratio of the element from group VIII relative to the element from group VIB is between 0.1 and 0.8.

14. The process for catalyst preparation as claimed in claim 1, wherein said step d) is an impregnating step, followed by a maturation step carried out at atmospheric pressure, at a temperature of between 17° C. and 50° C., for a time of between 10 minutes and 48 hours, then by a step of drying at a temperature of less than or equal to 120° C. for a time of between 30 minutes and 4 hours.

15. The process for catalyst preparation as claimed in claim 1, wherein said step e) is carried out in situ by means of an $H_2S/H_2$ or $H_2S/N_2$ gas mixture containing at least 5 volume % of $H_2S$, at a temperature greater than or equal to the ambient temperature, under a total pressure of greater than or equal to 1 bar for at least 2 h, or ex situ at a temperature of between 200 and 600° C. in the presence of hydrogen ($H_2$) and hydrogen sulfide ($H_2S$) or of an organic sulfur compound selected from dimethyl disulfide (DMDS), dimethyl sulfide, n-butyl mercaptan, and polysulfide compounds.

\* \* \* \* \*